US010503522B2

United States Patent
Lu et al.

(10) Patent No.: US 10,503,522 B2
(45) Date of Patent: Dec. 10, 2019

(54) METHOD FOR RESETTING A MEMORY IN A COMPUTER SYSTEM

(71) Applicant: Realtek Semiconductor Corp., HsinChu (TW)

(72) Inventors: Hsing-Chen Lu, Hsinchu (TW); Ya-Min Chang, Kaohsiung (TW)

(73) Assignee: Realtek Semiconductor Corp., HsinChu (TW)

( * ) Notice: Subject to any disclaimer, the term of this patent is extended or adjusted under 35 U.S.C. 154(b) by 121 days.

(21) Appl. No.: 15/608,958

(22) Filed: May 30, 2017

(65) Prior Publication Data
US 2017/0344390 A1    Nov. 30, 2017

(30) Foreign Application Priority Data

May 31, 2016  (TW) ............................. 105116961 A

(51) Int. Cl.
| | |
|---|---|
| *G06F 9/00* | (2006.01) |
| *G06F 9/445* | (2018.01) |
| *G06F 1/24* | (2006.01) |
| *G06F 9/4401* | (2018.01) |
| *G06F 12/0891* | (2016.01) |
| *G06F 8/654* | (2018.01) |
| *G06F 15/177* | (2006.01) |

(52) U.S. Cl.
CPC ............ *G06F 9/44505* (2013.01); *G06F 1/24* (2013.01); *G06F 8/654* (2018.02); *G06F 9/4401* (2013.01); *G06F 9/4403* (2013.01); *G06F 9/4408* (2013.01); *G06F 12/0891* (2013.01); *G06F 15/177* (2013.01)

(58) Field of Classification Search
CPC ........ G06F 9/44505; G06F 8/654; G06F 1/24; G06F 9/4401; G06F 9/4403; G06F 9/4408; G06F 12/0891
USPC .......................................................... 713/2
See application file for complete search history.

(56) References Cited

U.S. PATENT DOCUMENTS

| | | | |
|---|---|---|---|
| 2005/0246701 A1* | 11/2005 | Kanapathipillai | .. G06F 11/1433 717/168 |
| 2006/0062046 A1* | 3/2006 | Babudri | .............. G06F 11/1417 365/185.09 |

(Continued)

OTHER PUBLICATIONS

Daniel Jslin, "Core entry point: start_kernel ()" (https://danielmaker.github.io/blog/linux/start_kernel.html), Jan. 12, 2016.

*Primary Examiner* — Jaweed A Abbaszadeh
*Assistant Examiner* — Volvick Derose
(74) *Attorney, Agent, or Firm* — Winston Hsu

(57) ABSTRACT

A method for resetting a memory in the computer system includes turning on the computer system, and a memory controller of the computer system executing a boot code to initialize the memory. After the memory controller executes the boot code, the memory controller updates a programmable initialization code according to the boot code to generate an updated programmable initialization code. After resetting the computer system, the memory controller executes the updated programmable initialization code to restore the memory back to a default state. After the memory is restored to the default state, the memory controller executes the boot code to initialize the memory again. After the memory is initialized, the memory controller controls the memory to perform a normal operation.

14 Claims, 4 Drawing Sheets

(56) References Cited

U.S. PATENT DOCUMENTS

| | | | | |
|---|---|---|---|---|
| 2006/0070032 A1* | 3/2006 | Bramley | ............... | G06F 9/485 |
| | | | | 717/124 |
| 2006/0161811 A1* | 7/2006 | Welts | ............... | G06F 11/1435 |
| | | | | 714/15 |
| 2007/0050612 A1* | 3/2007 | Chen | ............... | G06F 11/1417 |
| | | | | 713/100 |
| 2007/0220240 A1* | 9/2007 | Su | ............... | G06F 8/65 |
| | | | | 712/248 |
| 2007/0220372 A1* | 9/2007 | Chen | ............... | G06F 8/65 |
| | | | | 714/52 |
| 2008/0040596 A1* | 2/2008 | Mai | ............... | G06F 9/4403 |
| | | | | 713/2 |
| 2008/0059960 A1* | 3/2008 | Akiyoshi | ............... | G06F 9/4406 |
| | | | | 717/170 |
| 2008/0082814 A1* | 4/2008 | Kuo | ............... | G06F 9/4403 |
| | | | | 713/2 |
| 2008/0086631 A1* | 4/2008 | Chow | ............... | G06F 8/654 |
| | | | | 713/2 |
| 2011/0107076 A1* | 5/2011 | Kim | ............... | G06F 9/4401 |
| | | | | 713/2 |
| 2011/0131563 A1* | 6/2011 | Ohama | ............... | G06F 8/65 |
| | | | | 717/168 |
| 2013/0042095 A1* | 2/2013 | Jung | ............... | G06F 9/24 |
| | | | | 713/2 |
| 2013/0067189 A1* | 3/2013 | Heinrich | ............... | G06F 9/4411 |
| | | | | 711/170 |
| 2013/0326206 A1* | 12/2013 | Lueck | ............... | G06F 9/4418 |
| | | | | 713/2 |
| 2016/0055008 A1* | 2/2016 | Park | ............... | G06F 9/24 |
| | | | | 713/2 |
| 2017/0084353 A1* | 3/2017 | Park | ............... | G11C 29/78 |
| 2017/0168841 A1* | 6/2017 | Ansari | ............... | G06F 9/4403 |

* cited by examiner

METHOD FOR RESETTING A MEMORY IN A COMPUTER SYSTEM

BACKGROUND OF THE INVENTION

1. Field of the Invention

The present invention relates to a method for resetting a memory in a computer system, especially relates to a method for resetting the memory that is able to ensure the memory to be initialized correctly during a resetting process.

2. Description of the Prior Art

Generally, when the computer system is turned on, the computer system will initialize the memory. After the memory is initialized, the computer system can control the memory through the memory controller for performing read operations and write operations of the memory in a mode required by the computer system. When the user resets the computer system, the memory should be restored to the default state so that the computer system can control the memory to perform operations again. In the prior art, the reset process of the memory may be done by hardware. For example, the memory may include a reset pin, and the memory controller can trigger the reset process of memory by controlling the reset pin of the memory. However, in this case, the memory has to include an additional pin, thereby increasing both the chip area of the memory and the complexity of the routing on the circuit board.

To avoid increasing the chip size of the memory, in the prior art, the reset process of the memory may also be done by software. For example, the memory controller may issue a set of predetermined reset instructions to the memory to reset the memory. However, the computer system may be reset under different conditions, and the status of the memory may vary before the computer system is reset. For example, the memory may receive the read/write instructions through two or four channels according to the system requirement. In this case, when the memory controller controls the memory with reset instructions that are fixed, the memory may not be reset correctly, after the computer system has reset, if the number of channels being used by the memory do not match with the number of channels the memory controller, according to the fixed reset instructions, is configured to use. If the memory is not reset correctly, the computer system would not be able to initialize the memory again and would not be able to control the memory to perform read/write operations after the computer system is reset.

Therefore, a method for ensuring that the memory can be reset correctly together with the computer system and then correctly initialized without adding additional pins has become an issue to be solved.

SUMMARY OF THE INVENTION

One embodiment of the present invention discloses a method for resetting a memory in a computer system. The computer system includes a memory controller. The method includes turning on the computer system, the memory controller executing a boot code to initialize the memory, the memory controller updating a programmable initialization code according to the boot code to generate a first updated programmable initialization code after the memory controller executes the boot code, resetting the computer system, the memory controller executing the first updated programmable initialization code to restore the memory back to a default state, the memory controller executing the boot code to initialize the memory again after the memory is restored to the default state, and the memory controller controlling the memory to perform a normal operation after the memory is initialized again. The programmable initialization code is stored in the memory controller.

One embodiment of the present invention discloses a method for resetting a memory in a computer system. The computer system includes a memory controller. The method includes turning on the computer system, the memory controller executing a boot code to initialize the memory, the memory controller generating a programmable initialization code according to the boot code after the memory controller executes the boot code, resetting the computer system, the memory controller executing the programmable initialization code to restore the memory back to a default state, the memory controller executing the boot code to initialize the memory again after the memory is restored to the default state, and the memory controller controlling the memory to perform a normal operation after the memory is initialized again. The programmable initialization code is stored in the memory controller.

One embodiment of the present invention discloses a method for resetting a memory in a computer system. The computer system includes a memory controller. The method includes turning on the computer system, the memory controller executing a boot code to initialize the memory, the memory controller controlling the memory to perform a normal operation after the memory controller executes the boot code, the memory controller updating a programmable initialization code according to the normal operation to generate an updated programmable initialization code when the memory controller controls the memory to perform the normal operation, resetting the computer system, the memory controller executing the updated programmable initialization code to restore the memory back to the default state after resetting the computer system, and the memory controller executing the boot code again to initialize the memory after the memory is restored to the default state. The programmable initialization code is stored in the memory controller.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
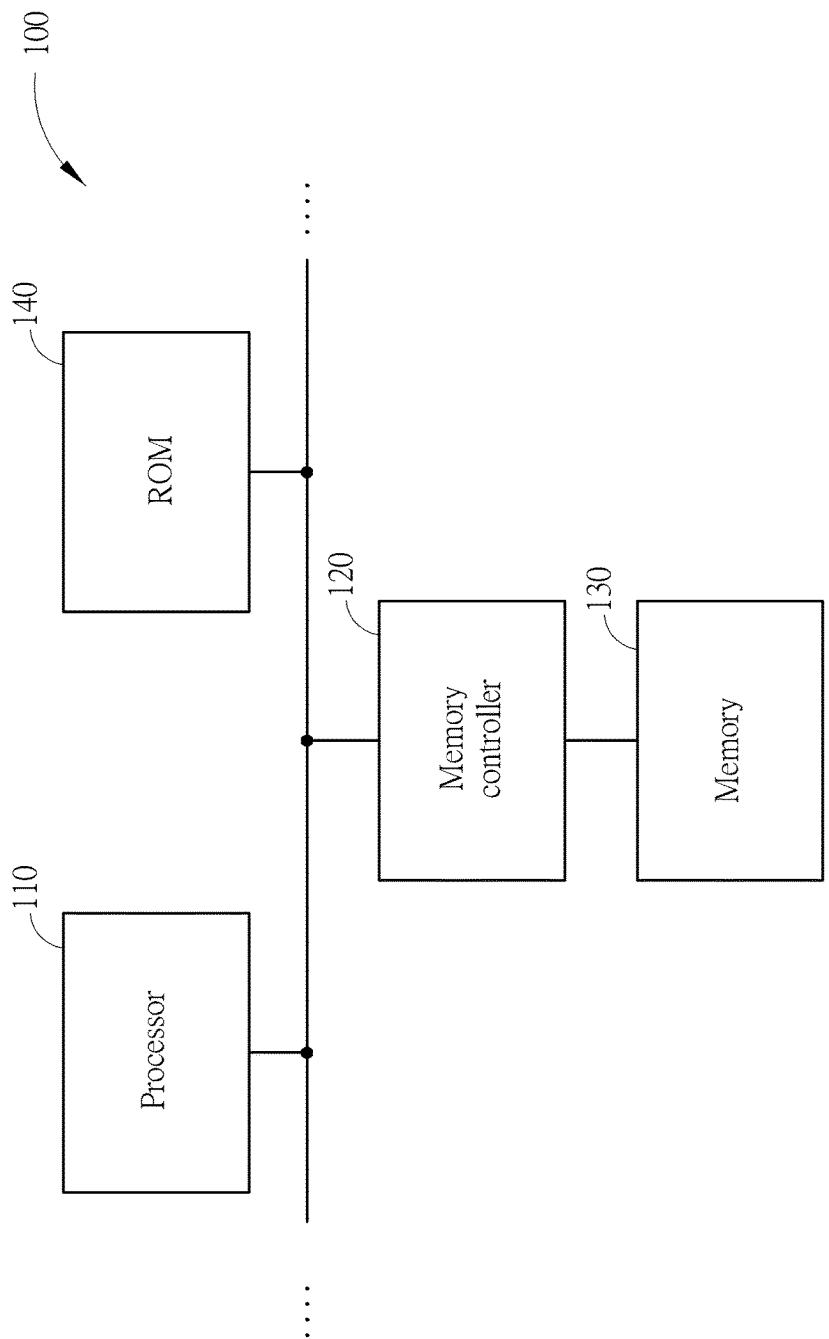
FIG. 1 shows a computer system according to one embodiment of the present invention.

FIG. 1 shows a computer system 100 according to one embodiment of the present invention. The computer system 100 includes a processor 110, a memory controller 120, and a memory 130. The processor 110 can perform read operations and write operations to the memory 130 through the memory controller 120.

When the computer system 100 is turned on, the memory 130 will be connected to power supply. After the memory 130 is connected to the power supply, the memory 130 will enter a default state. The memory controller 120 can start to initialize the memory 130 once the power supply becomes stable. The memory controller 120 can execute the boot code to initialize the memory 130, and configure the memory 130 from the default state to an initialized state required by the computer system 100. In some embodiments, the memory 130 can be any type of volatile memories, or any type of non-volatile memories, such as a NAND flash memory and a NOR flash memory.

For example, if the memory 130 is a flash memory supporting four channels, then the memory 130 may receive instructions by one single channel under the default state. Therefore, during the time period of executing the boot code, the memory controller 120 may use single channel communication to configure the state of the memory 130, for example, the state of using one single channel for receiving and transmitting instructions may be changed to a state of using dual channels or quad channels for receiving and transmitting instructions. In this case, the computer system 100 can control the memory 130 to perform the read operations and the write operations through the memory controller 120. In some embodiments, the boot code can be stored in the read only memory (ROM) 140 of the computer system 100.

In some embodiments, the computer system 100 can be reset without being disconnected from the power supply, that is, the warm reset. In this case, if the memory controller 120 tries to initialize the memory 130 before the memory 130 is restored back to the default state, the memory 130 may not be able to identify the instruction, and the initialization may fail. For example, the memory controller 120 may try to initialize the memory 130 by single channel communication; however, the memory 130 may receive instructions with four channels. Therefore, the memory 130 is not able to identify the instruction and the initialization fails.

To avoid the memory controller 120 initializes the memory 130 before the memory 130 is restored back to the default state, causing the failure of the initialization of the memory 130, the memory controller 120 can update a programmable initialization code IP0 according to the boot code to generate an updated programmable initialization code IPC1 after the memory controller 120 executes the boot code. For example, if the memory 130 is set for receiving instructions and transmitting data with four channels in the boot code, then the memory controller 120 will communicate with the memory 130 with four channels first and configure the memory 130 back to the required state when executing the updated programmable initialization code IP1. Therefore, when the computer system 100 is reset, the memory 130 will be restored back to the default state after the controller 120 executes the updated programmable initialization code IP1. After the memory 130 is restored to the default state, the memory controller 120 can execute the boot code again to initialize the memory 130. In this case, the memory 130 will be able to identify the instructions of the boot code so the initialization of the memory 130 can be completed correctly. After the memory 130 is initialized, the memory controller 120 can control the memory 130 to perform other normal operations, such as the read operations and/or the write operations.

Table 1 shows the content of the programmable initialization code IPC1 according to one embodiment of the present invention. Although Table 1 shows a possible embodiment of the programmable initialization code IPC1, in other embodiments of the present invention, the programmable initialization code may include different types of columns and/or different types of instructions according to the reset process of the memory and the required instructions.

| instruction | Counting column | Status column | Channel column | Instruction data column |
|---|---|---|---|---|
| I1 | F | 1 | 1 | 66 |
| I2 | F | 1 | 1 | 99 |
| I3 | F | 1 | 1 | 06 |
| I4 | F | 2 | 1 | 01 |
| I5 | F | 0 | 1 | 00 |

In the embodiment of Table 1, the programmable initialization code IPC0 includes five instructions I1 to I5, and each of the instructions I1 to I5 includes a counting column, a status column, a channel column, and an instruction data column. Also, in Table 1, the value of each column is shown in a hexadecimal form.

The counting column stores a waiting time after executing the instruction. For example, the counting column of the instruction I1 shows "F" so the memory controller 120 may start to increment a variable by a counter after executing the instruction I1, and the memory controller 120 will not execute the next instruction until the variable reaches 16.

The status column can indicate the presence of a following instruction, the presence of following output data or termination of the programmable initialization code. In the embodiment of Table 1, if the status column shows "0", such as the status column of the instruction I5, it may represent that the instruction I5 is the last instruction, the programmable initialization code IPC1 will be terminated, and there is no more instruction. If the status column shows "1", such as the status columns of the instructions I1, I2, and I3, it may represent that the memory controller 120 can execute a following instruction after the instruction I1, I2 or I3. If the status column shows "2", such as the status column of the instruction I4, it may represent that the memory controller 120 may further transmit the writing data to the memory 130 after executing the instruction I4 so that the following instruction cannot be executed directly.

The channel column can store the number of channels being used when the memory controller 120 executes the present instruction. For example, since the values of the channel columns of the instructions I1 to I5 are "1", it may represent that the memory controller 120 can transmit the instruction to the memory 130 through one single channel.

The instruction data column can store the content of the instruction or the data associated with a previous instruction, that is, the instruction that the memory controller 120 controls the memory 130 to execute or the data that the memory controller 120 controls the memory 130 to receive. In Table 1, the instruction I1 with the instruction data column showing "66" can be used to signify the memory 130 to enable the necessary functions for the internal reset process. The instruction I2 with the instruction data column showing "99" can be used to signify the memory 130 to perform the internal reset process. The instructions I3 to I5 with the instruction data column showing "06", "01" and "00" can be used to enable the writing function of the memory 130, indicate the writing address, and indicate the writing data respectively. Therefore, the memory controller 120 can control the memory 130 to perform the write operation.

That is, when the operation state of the memory 130 changes, the programmable initialization code IPC1 can also be updated correspondingly. For example, if the memory 130 changes from a single channel state to a dual channel state, the channel column of the instruction I1 may be updated from "1" to "2". Consequently, during the following reset process, the memory 130 will still be able to receive the reset instruction correctly and will be restored back to the default state for the following initialization.

In some embodiments, the programmable initialization codes IPC0 and IPC1 can be stored in the initialization code memory 122 of the memory controller 120. Also, in some embodiments, the initialization code memory 122 can be non-volatile memory so that the memory controller 120 can ensure the memory 130 to be restored back to the default state for the following initialization according to the aforesaid process even when the computer system 100 is hard reset, that is, the power supply is shut down during the reset.

After the memory 130 completes the initialization, the memory controller 120 may control the memory 130 to perform other operations, and may change the state of the memory 130. Therefore, when the memory controller 120 controls the memory 130 to perform other operations, the memory controller 120 can update the programmable initialization code IPC1 again according to the operations to generate a further updated programmable initialization code IPC2. Consequently, after the programmable initialization code IPC2 is generated, if the computer system 100 is reset again, the memory controller 120 may execute the updated programmable initialization code IPC2 to restore the memory 130 back to the default state during the reset process. After the memory 130 is restored to the default state, the memory controller 120 can execute the boot code to initialize the memory 130.

In addition, when the computer 100 is turned on the first time and the memory 130 is connected to the power supply the first time, the memory 130 should be at the default state since the memory 130 has not been initialized yet and has not performed any operation. In this case, before the memory controller 120 executes the boot code, the initialization code memory 122 may not store any programmable initialization code, and the memory controller 120 may generate the programmable initialization code IPC0 according to the boot code after executing the boot code.

That is, since the memory controller 120 can keep updating the programmable initialization code stored in the initialization code memory 122, the memory controller 120 can restore the memory 130 back to the default state by executing the programmable initialization code and ensure the memory 130 to complete the following initialization process smoothly no matter when the computer system 100 is reset.

Figure 2:
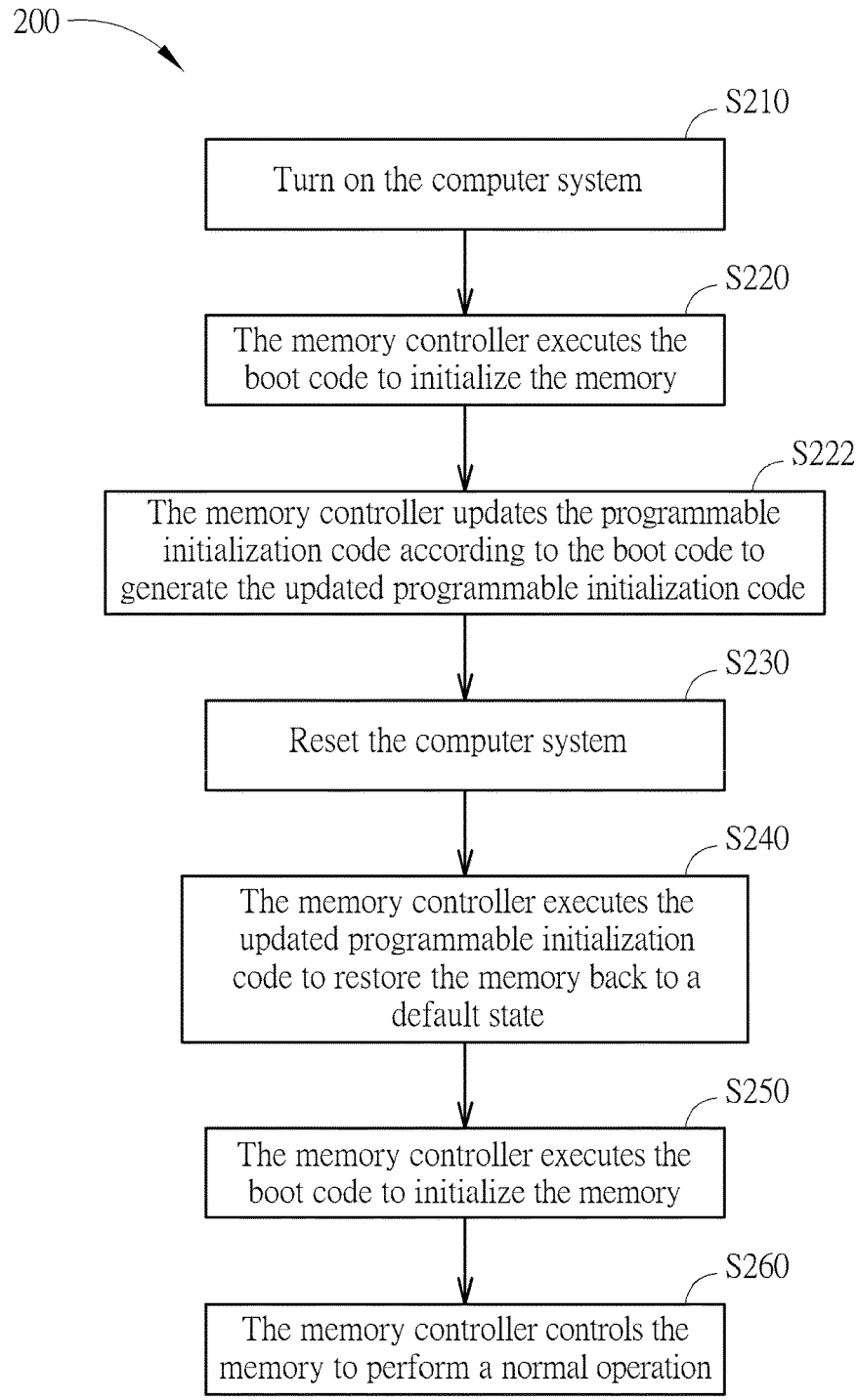
FIG. 2 shows a method for resetting the memory of the computer system of FIG. 1 according to one embodiment of the present invention.

FIG. 2 shows a method 200 for resetting the memory 130 of the computer system 100 according to one embodiment of the present invention. The method 200 includes steps S210 to S260.

S210: turn on the computer system 100;
S220: the memory controller 120 executes the boot code to initialize the memory 130;
S222: the memory controller 120 updates the programmable initialization code IPC0 according to the boot code to generate the updated programmable initialization code IPC1;
S230: reset the computer system 100;
S240: the memory controller 120 executes the updated programmable initialization code IPC1 to restore the memory 130 back to a default state;
S250: the memory controller 120 executes the boot code to initialize the memory 130 again; and
S260: the memory controller 120 controls the memory to perform a normal operation.

According to the method 200, the memory controller 120 can update the programmable initialization code IPC0 to generate the updated programmable initialization code IPC1 according to the boot code in step S222 after the memory 130 is initialized in step S220. Therefore, when the computer system 100 is reset in step S230, the memory controller 120 can execute the updated programmable initialization code IPC1 in step S240 to restore the memory 130 back to the default state.

Figure 3:
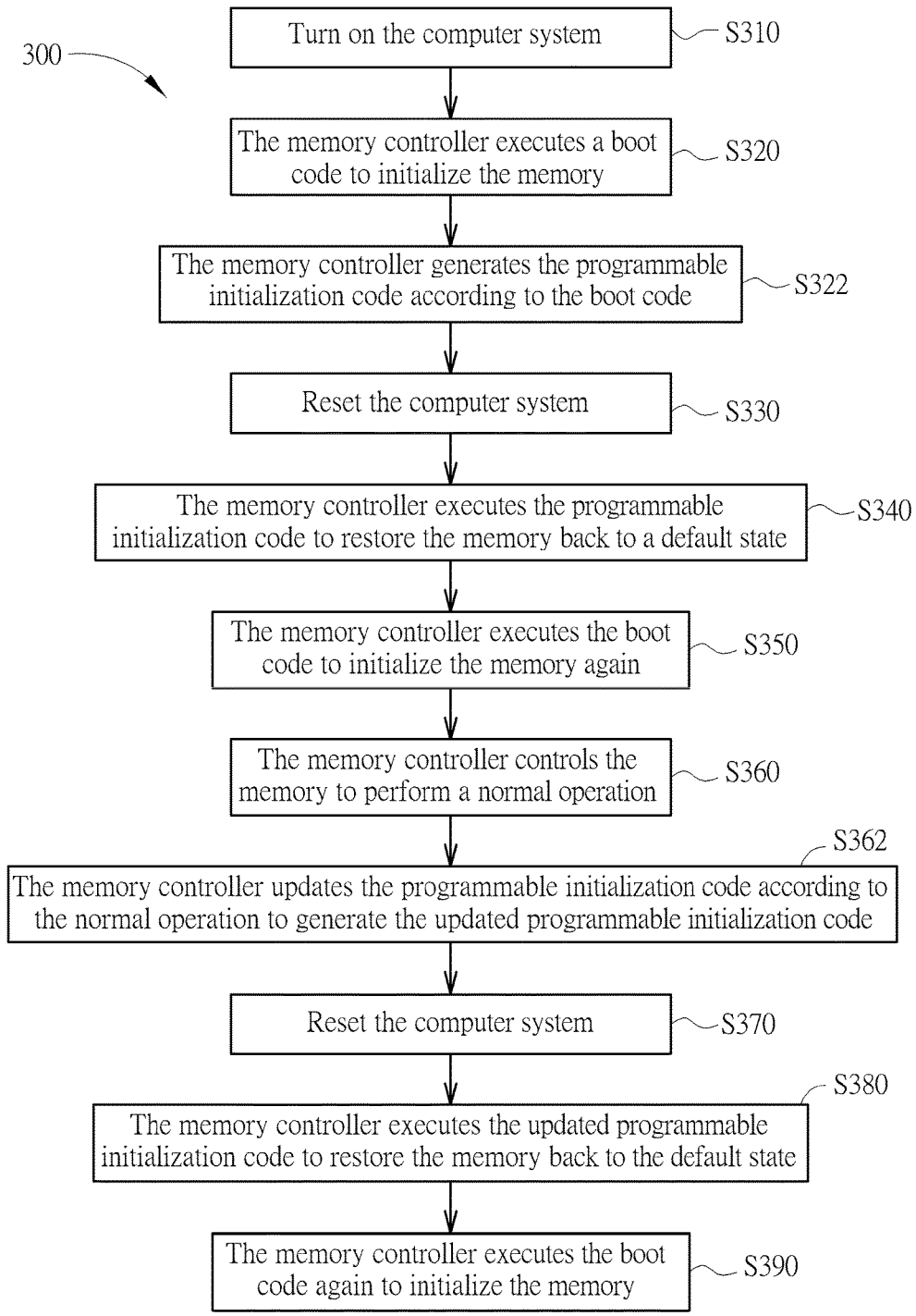
FIG. 3 shows a method for resetting the memory of the computer system of FIG. 1 according to another embodiment of the present invention.

In some embodiments, when the memory 130 is initialized for the first time, the memory controller 120 may not store any programmable initialization code yet. Therefore, the memory controller 120 may generate the programmable initialization code IPC0 according to the boot code directly. FIG. 3 shows a method 300 for resetting the memory 130 of the computer system 100 according to one embodiment of the present invention. The method 300 includes steps S310 to S390.

S310: turn on the computer system 100;
S320: the memory controller 120 executes a boot code to initialize the memory 130;
S322: the memory controller 120 generates the programmable initialization code IPC0 according to the boot code;
S330: reset the computer system 100;
S340: the memory controller 120 executes the programmable initialization code IPC0 to restore the memory 130 back to a default state;
S350: the memory controller 120 executes the boot code to initialize the memory 130 again;
S360: the memory controller 120 controls the memory to perform a normal operation;
S362: the memory controller 120 updates the programmable initialization code IPC0 according to the normal operation to generate the updated programmable initialization code IPC1;
S370: reset the computer system 100 again;
S380: the memory controller 120 executes the updated programmable initialization code IPC1 to restore the memory 130 back to the default state; and
S390: the memory controller 120 executes the boot code again to initialize the memory 130.

The difference between step S322 and S222 is in that the memory controller 120 generates the programmable initialization code IPC0 according to the boot code in step S322 while the memory controller 120 generates the programmable initialization code IPC1 by updating the programmable initialization code IPC0 according to the boot code in step S322. Furthermore, the method 300 can include steps S362 to S390. Since, in step S362, the memory controller 120 can update the programmable initialization code IPC0 to generate the programmable initialization code IPC1 according to the normal operation performed in step S360, the memory controller 120 can execute the programmable initialization code IPC1 to restore the memory 130 back to the default state in step S380 after the computer system 100 is reset again in step S370. Therefore, the memory 130 can be initialized correctly in step S390. In some embodiments of the present invention, the method 200 may also include steps S362 to S390.

Figure 4:
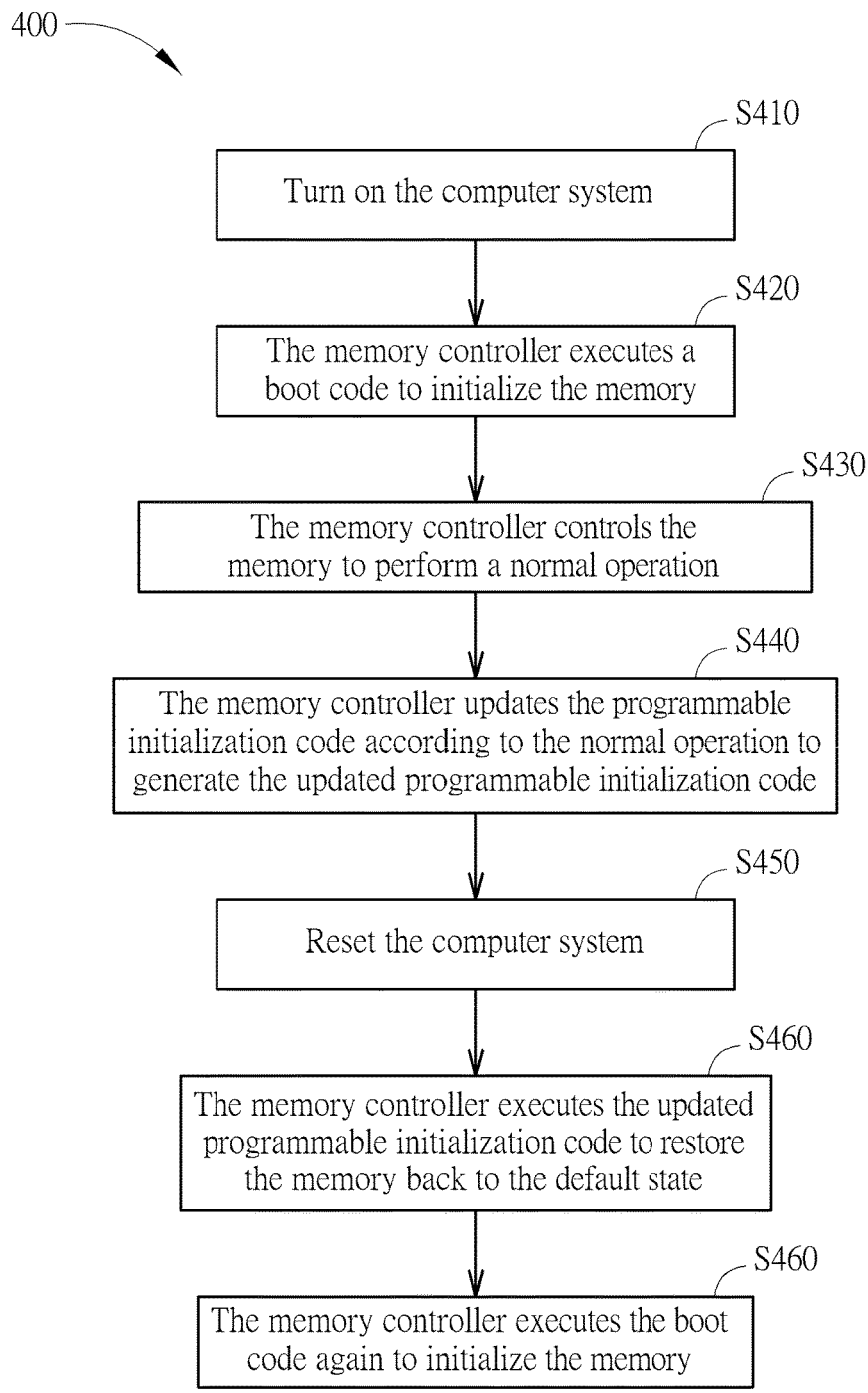
FIG. 4 shows a method for resetting the memory of the computer system of FIG. 1 according to another embodiment of the present invention.

In addition, in some embodiments, the computer system 100 may be reset at a different time from the steps shown in the method 200 or 300. For example, if the computer system 100 is not reset right after the first-time initialization of the memory 130, but is reset after the memory controller 120 controls the memory 130 to perform other operations, then some of the steps in method 300 may be skipped. FIG. 4 shows a method 400 for resetting the memory 130 of the computer system 100 according to one embodiment of the present invention. The method 400 includes steps S410 to S470.

S410: turn on the computer system 100;
S420: the memory controller 120 executes a boot code to initialize the memory 130;
S430: the memory controller 120 controls the memory 130 to perform a normal operation;
S440: the memory controller 120 updates the programmable initialization code IPC0 according to the normal operation to generate the updated programmable initialization code IPC1;
S450: reset the computer system 100;
S460: the memory controller 120 executes the updated programmable initialization code IPC1 to restore the memory 130 back to the default state; and
S470: the memory controller 120 executes the boot code again to initialize the memory 130.

That is, as long as the memory controller 120 can update the programmable initialization code according to the corresponding operations before changing the state of the memory 130, the memory controller 120 can always restore the memory 130 back to the default state by the programmable initialization code whenever the computer system 100 is reset so the memory 130 can be initialized correctly.

In summary, the computer system and the method for resetting the memory of the computer system provided by the embodiments of the present invention can use the memory controller to keep updating the programmable initialization code; therefore, the memory can be restored to the default state for the following initialization regardless when the computer system is reset. Also, since the computer system and the method provided by the embodiments of the present invention reset the memory by software, the computer system can operate the memory in a more efficient way without using additional pins.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for resetting a memory in a computer system, the computer system comprising a memory controller, and the method comprising:
    turning on the computer system;
    executing, by the memory controller, a boot code to initialize the memory;
    after the memory controller executes the boot code, the memory controller updating a programmable initialization code according to the boot code to generate a first updated programmable initialization code;
    resetting the computer system;
    the memory controller executing the first updated programmable initialization code to restore the memory back to a default state;
    after the memory is restored to the default state, the memory controller executing the boot code to initialize the memory again; and
    after the memory is initialized again, the memory controller controlling the memory to perform a normal operation;
    wherein the programmable initialization code is stored in the memory controller; and
    wherein the programmable initialization code comprises a plurality of instructions each comprising:
        a counting column configured to store a waiting time after executing the instruction;
        a status column configured to indicate presence of a following instruction, presence of following output data or termination of the programmable initialization code;
        a channel column configured to store number of channels being used when executing the instruction; and
        an instruction data column configured to store a content of the instruction or data associated with a previous instruction.

2. The method of claim 1 further comprising:
    when the memory controller controls the memory to perform the normal operation, the memory controller updating the first updated programmable initialization code according to the normal operation to generate a second updated programmable initialization code.

3. The method of claim 2 further comprising:
    after the second updated programmable initialization code is generated, resetting the computer system again;
    after resetting the computer system again, the memory controller executing the second updated programmable initialization code to restore the memory back to the default state; and
    after the memory controller executes the second updated programmable initialization code to restore the memory back to the default state, the memory controller executing the boot code again to initialize the memory.

4. The method of claim 1, wherein the boot code is stored in a read only memory (ROM) of the computer system.

5. The method of claim 1, wherein the programmable initialization code is stored in a non-volatile memory of the memory controller.

6. A method for resetting a memory in a computer system, the computer system comprising a memory controller, the method comprising:
    turning on the computer system;
    executing, by the memory controller, a boot code to initialize the memory;
    after the memory controller executes the boot code, the memory controller generating a programmable initialization code according to the boot code;
    resetting the computer system;
    the memory controller executing the programmable initialization code to restore the memory back to a default state;
    after the memory is restored to the default state, the memory controller executing the boot code to initialize the memory again; and
    after the memory is initialized again, the memory controller controlling the memory to perform a normal operation;
    wherein the programmable initialization code is stored in the memory controller; and
    wherein the programmable initialization code comprises a plurality of instructions each comprising:
        a counting column configured to store a waiting time after executing the instruction;
        a status column configured to store information of whether there is a following instruction, following output data or no more instructions after executing the instruction;

a channel column configured to store a number of channels being used when executing the instruction; and an instruction data column configured to store the information or data of the instruction.

7. The method of claim 6 further comprising:

when the memory controller controls the memory to perform the normal operation, the memory controller updating the programmable initialization code according to the normal operation to generate an updated programmable initialization code.

8. The method of claim 7 further comprising:

after the updated programmable initialization code is generated, resetting the computer system again;

after resetting the computer system, the memory controller executing the updated programmable initialization code to restore the memory back to the default state; and after the memory controller executes the updated programmable initialization code to restore the memory back to the default state, the memory controller executing the boot code again to initialize the memory.

9. The method of claim 6, wherein the boot code is stored in a read only memory (ROM) of the computer system.

10. The method of claim 6, wherein the programmable initialization code is stored in a non-volatile memory of the memory controller.

11. A method for resetting a memory in a computer system, the computer system comprising a memory controller, and the method comprising:

turning on the computer system;

executing, by the memory controller, a boot code to initialize the memory;

after the memory controller executes the boot code, the memory controller controlling the memory to perform a normal operation;

when the memory controller controls the memory to perform the normal operation, the memory controller updating a programmable initialization code according to the normal operation to generate an updated programmable initialization code;

resetting the computer system;

after resetting the computer system, the memory controller executing the updated programmable initialization code to restore the memory back to the default state; and after the memory is restored to the default state, the memory controller executing the boot code again to initialize the memory;

wherein the programmable initialization code is stored in the memory controller; and wherein the programmable initialization code comprises a plurality of instructions each comprising:

a counting column configured to store a waiting time after executing the instruction;

a status column configured to store information of whether there is a following instruction, following output data or no more instructions after executing the instruction;

a channel column configured to store a number of channels being used when executing the instruction; and an instruction data column configured to store the information or data of the instruction.

12. The method of claim 11, wherein the programmable initialization code comprises a plurality of instruction, each comprises:

a counting column configured to store a waiting time after executing the instruction;

a status column configured to store information of whether there is a following instruction, following output data or no more instructions after executing the instruction;

a channel column configured to store a number of channels being used when executing the instruction; and an instruction data column configured to store the information or data of the instruction.

13. The method of claim 11, wherein the boot code is stored in a read only memory (ROM) of the computer system.

14. The method of claim 11, wherein the programmable initialization code is stored in a non-volatile memory of the memory controller.

* * * * *